(No Model.)
F. F. ADAMS.
TRUCK.
No. 284,586. Patented Sept. 11, 1883.
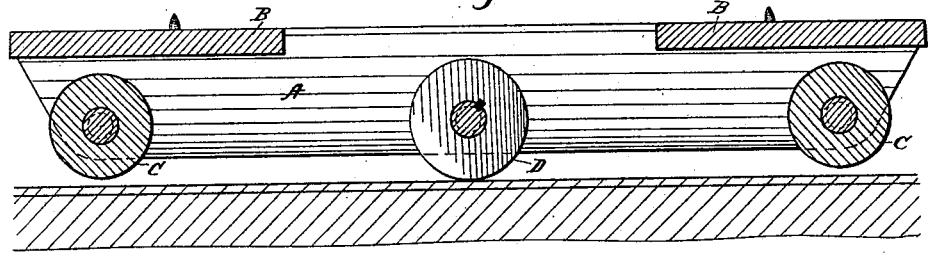
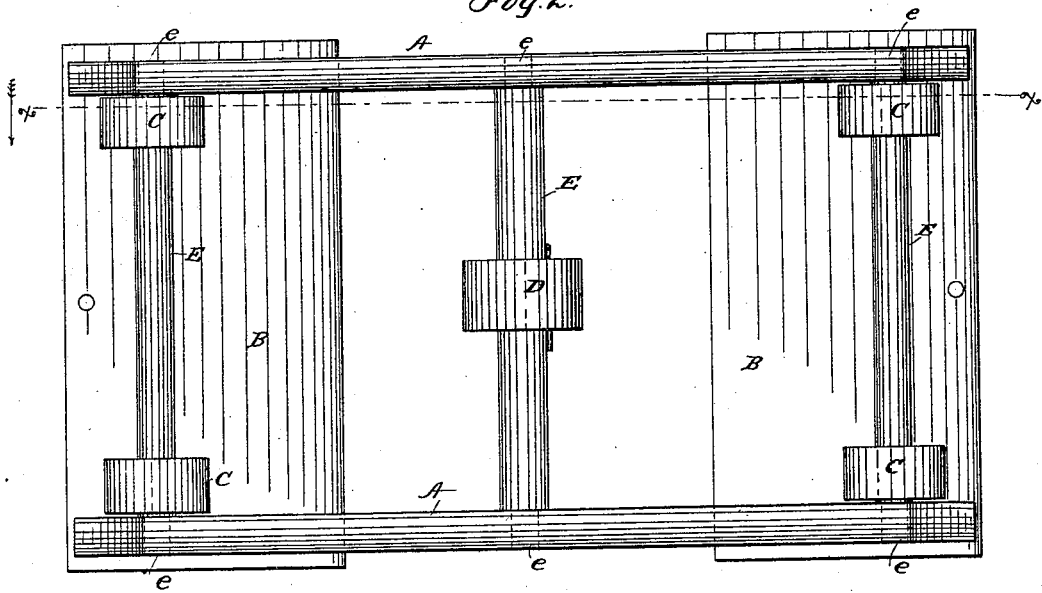
Witnesses.
W. R. Edelin Del.
R. H. Porter.
Inventor.
F. F. Adams
Per Hallock & Hallock
Att's

UNITED STATES PATENT OFFICE.

FRANKLIN F. ADAMS, OF ERIE, PENNSYLVANIA.

TRUCK.

SPECIFICATION forming part of Letters Patent No. 284,586, dated September 11, 1883.

Application filed June 18, 1883. (No model.)

*To all whom it may concern:*

Be it known that I, FRANKLIN F. ADAMS, a citizen of the United States, residing at Erie, in the county of Erie and State of Pennsylvania, have invented certain new and useful Improvements in Trucks; and I do hereby declare the following to be a full, clear, and exact description of the invention, such as will enable others skilled in the art to which it appertains to make and use the same.

This invention consists in providing certain new and useful improvements in trucks for moving boxes, bales, barrels, &c., as will hereinafter fully appear.

The class or style of truck to which this invention relates is such as are made low, with small rollers, and have no handles, and are adapted to be easily placed under the article to be moved by rolling the article over upon them, or raising the article a little way up and sliding the truck under it. In trucks of this class difficulty is experienced in guiding them when heavily loaded or when under a large box or bale, as the rollers or wheels are not adapted to permit the turning of curves as where they are mounted on axles which are pivoted. This difficulty I overcome by the construction shown, which is as follows:

The truck is provided with five wheels, one in each corner and one in the center, C C C C and D, and the one in the center, D, is either of greater diameter than the others, or else has its bearing so placed as to bring its tread lower than the others. This arrangement causes the truck to always run on only three of its five rollers or wheels—namely, the central one, D, and two others; and it makes it easy for the operator to poise the load on the central wheel and swing it around on that wheel, as on a pivot, and head the truck in any direction desired. The central wheel should have a face of sufficient width to prevent it marring the floor, it being kept in mind that the weight, which is divided between the two corner wheels C, is carried wholly by the central wheel at times, and so should properly have a wider face; but as this wheel is used as a pivot, it is better not to make the face any wider than necessary to prevent denting the floor. If the face of this wheel D were beveled each way from the middle, it would perhaps serve better as a pivot; but it would dent the floor badly, and, besides, it would require more care to guide the truck in a direct line than it would if the face of this wheel were as shown in the drawings.

From the foregoing the principle of construction will be understood.

The details of construction are shown in the drawings, and are as follows:

Figure 1 shows the truck in section on the line $x$ $x$ in Fig. 2. Fig. 2 is a plan view of the under side of the truck.

A A are the side pieces; B B, the top pieces; E E E, the axle-trees or shafts of the rollers or wheels.

C C C C and D are the wheels or rollers; $e$ $e$ $e$, &c., are the journals or bearings of the shafts E.

The shafts E and the rollers thereon may be of one piece of metal or wood; or the wheels may be fastened upon the shafts by keys or otherwise; or the wheels may be journaled on the shafts, if desired, in which case there would be no journal-bearings at $e$ $e$.

I am aware of the construction of truck shown in Patent No. 113,263, of April 4, 1871, to John S. Cochran; and I do not claim as my invention anything therein shown. In fact, my device is an improvement on said construction, for by using only one wheel in the center of the truck, in place of two in the middle, the center of motion when turning is in the center of the truck, while in the other case it must be on one side or the other, and in that case much more space is required for turning than by my construction.

What I claim as new is—

1. A truck, substantially as shown, having five wheels, one at each corner of its frame and one placed centrally, as shown, the latter of which has its tread in a different plane from the four corner wheels, as shown, and for the purposes mentioned.

2. A truck, substantially as shown, consisting of the frame A A and B B, in which are mounted three shafts or axles, E E E, one at each end of the frame and one in the middle, the latter of which is provided with a wheel, D, in its middle, and the former with wheels C C at their ends, said wheels C C having their tread in a different plane from the said wheel D, as shown, and for the purposes set forth.

In testimony whereof I affix my signature in presence of two witnesses.

F. F. ADAMS.

Witnesses:
  JNO. K. HALLOCK,
  W. S. BROWN.